United States Patent [19]

Westermayer

[11] 4,329,545

[45] May 11, 1982

[54] CIRCUIT ARRANGEMENT FOR THE CONTROL OF SEMI-DUPLEX DATA TRANSMISSION SYSTEM

[75] Inventor: Jörg Westermayer, Munich, Fed. Rep. of Germany

[73] Assignee: Siemens Aktiengesellschaft, Berlin & Munich, Fed. Rep. of Germany

[21] Appl. No.: 659,969

[22] Filed: Feb. 19, 1976

[30] Foreign Application Priority Data

Feb. 24, 1975 [DE] Fed. Rep. of Germany ....... 2507804

[51] Int. Cl.³ .............................................. H04L 9/00
[52] U.S. Cl. ............................... 178/22.03; 178/22.17; 178/22.19
[58] Field of Search ................. 178/22, 58 A, 58 R, 178/2 R, 4.1 R, 22.03, 22.17, 22.19

[56] References Cited

U.S. PATENT DOCUMENTS

| | | | |
|---|---|---|---|
| 2,406,829 | 9/1946 | Haglund et al. | 178/22 |
| 2,874,215 | 2/1959 | Zenner | 178/22 |
| 2,897,268 | 7/1959 | Bacon et al. | 178/22 |
| 2,898,402 | 8/1959 | Cory et al. | 178/22.03 |
| 3,522,374 | 7/1970 | Abrahamsen et al. | 178/22 |
| 3,546,380 | 12/1970 | Sturzinger | 178/22 |
| 3,627,928 | 12/1971 | Wolper et al. | 178/22 |
| 3,670,104 | 6/1972 | Abrahamsen | 178/22 |
| 3,725,579 | 4/1973 | Sturzinger | 178/22 |
| 3,878,331 | 4/1975 | Morgan et al. | 178/22 |

*Primary Examiner*—Howard A. Birmiel
*Attorney, Agent, or Firm*—Hill, Van Santen, Steadman, Chiara & Simpson

[57] ABSTRACT

In a circuit arrangement for the control of semi-duplex data transmission systems, which operate in accordance with crypto techniques, and in which the data of a data source are supplied to a data terminal by way of a transmission side crypto device, a transmission path and a receiving side crypto device, the data of the data source are supplied to a transmitting side shift register and a serially processed toward the receiving side crypto device by way of an output of the shift register and the transmitting side crypto device, and an order evaluator is connected to a number of cells of the shift register to produce a reset signal if an order word occurs, the reset signal causing erasure of the content of the individual, or all, cells of the shift register.

3 Claims, 5 Drawing Figures

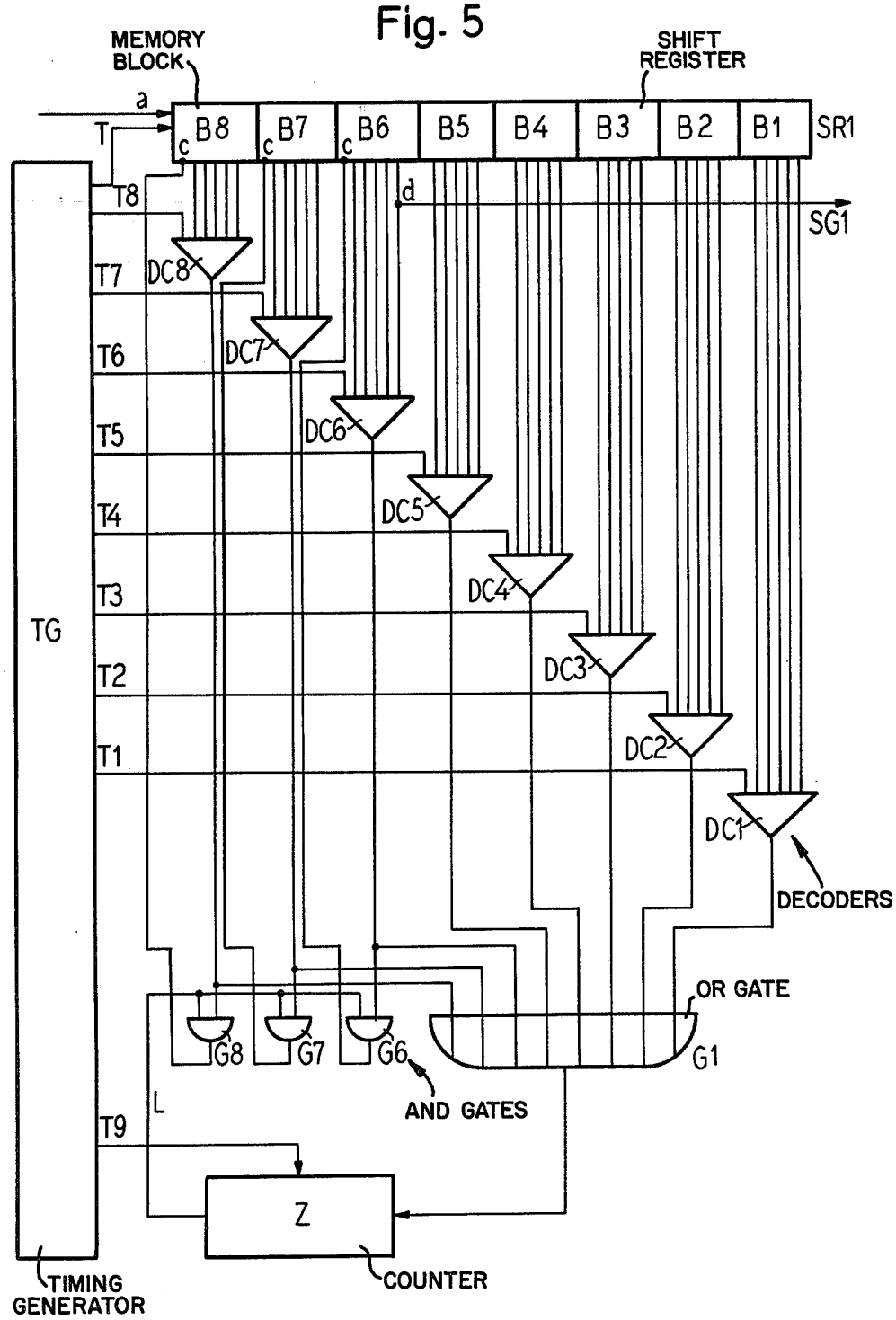

CIRCUIT ARRANGEMENT FOR THE CONTROL OF SEMI-DUPLEX DATA TRANSMISSION SYSTEM

BACKGROUND OF THE INVENTION

1. Field of the Invention

This invention relates to a circuit arrangement for the control of semi-duplex transmission systems in the case of crypto operation, and more particularly to such systems in which the data of a data source are supplied to a data terminal by way of a transmitting and a receiving side crypto device.

2. Description of the Prior Art

As is well known in the art, a character adapted stopping and starting of crypto generators in the case of transmission change in semi-duplex connections is effected with the help of an order block. The order block, consisting of several bit groups, is transmitted by the transmitting side crypto device and causes the character-correct stopping of the receiving side crypto generator. Simultaneously, with the transmission of the order block, the transmitting side crypto generator is also character-correct stopped. In the case of the transmission of desired bit sequences, it can generally not be avoided that bit patterns occur which accidentally equal the order blocks. In the case of prior art data transmission systems of this type, such inadvertently occurring order blocks cause an undesired stopping of the crypto generators, a situation which is generally reversed by the action of operating personnel. This undesired stopping of the crypto generators diminishes the effectiveness of the transmission system.

SUMMARY OF THE INVENTION

The present invention is based on the task of providing a circuit arrangement for the control of semi-duplex data transmission systems, in the case of a crypto operation, wherein accidentally and inadvertently occurring order blocks are safely avoided.

According to the invention, the data of the data source are supplied to a transmitting side shift register and are serially fed toward the receiving side crypto device by way of an output of the shift register and by way of the transmitting side crypto device. An order evaluator is connected to several cells of the shift register and produces a reset signal upon the occurrence of an order word. This reset signal causes an erasure of the content of the individual cells, or of all cells, of the shift register.

A circuit arrangement constructed in accordance with the present invention is characterized in that it safely prevents accidentally occuring order blocks, since the clear text is controlled on the transmitting side, and the clear text is changed if accidental order blocks occur. The clear text changed in this manner cannot then cause any faulty controls at the receiving side. The invention is based on the recognition that a minor and relatively seldom-to-be effected change of the clear text is less of an interference than faulty controls of the crypto generators.

In a preferred exemplary embodiment of the invention, the cells of the shift register are connected block-by-block to a decoder, respectively, and the outputs of these decoders are connected to a counter which emits the reset signal when a given counter state is reached, and the contents of the shift register is erased with the help of this reset signal.

BRIEF DESCRIPTION OF THE DRAWINGS

Other objects, features and advantages of the invention, its organization construction and operation will be best understood from the following detailed description, taken in conjunction with the accompanying drawings, on which:

FIG. 5 is a schematic diagram of another exemplary embodiment of the order evaluator illustrated in FIG. 2.

DESCRIPTION OF THE PREFERRED EMBODIMENTS

Figure 1:
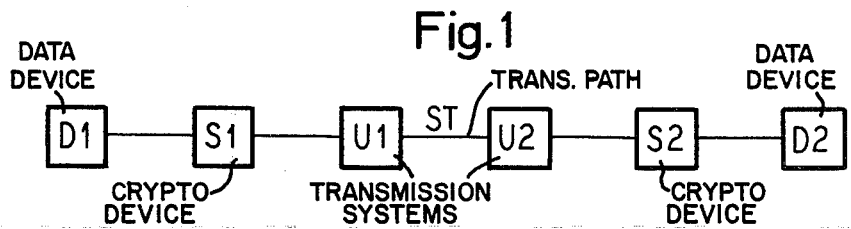
FIG. 1 is a schematic block diagram of a data transmission system.

Referring first to FIG. 1, a data transmission system is illustrated which comprises a pair of data devices D1 and D2, a pair of crypto devices S1 and S2, and a pair of transmission systems U1 and U2.

When the data are transmitted both from the data device D1 to the data device D2, and alternately and in the opposite direction from the data device D2 to the data device D1, then a keyboard and a visual indicator, respectively, may be provided as the data devices D1 and D2. The data devices emit the data in the form of binary signals whose binary values are associated with two different amplitudes of the signal. The data are generally transmitted within a given bit frame and within a given character frame. Thereby, a character may, for example, consist of eight bits. In the case of a single side data transmission, it is presumed that the crypto device S1 effects a coding of the data received from the data device D1, whereas the crypto device S2 causes a decoding of the received data which it in turn feeds to the data device D2. If a data transmission is presumed alternately in both directions, then the crypto devices S1 and S2 will cause an encoding, as well as a decoding, respectively, of the received data.

A telephone line, and ultra-short wave radio path or a directional radio path may be provided, for example, as the transmission path ST. The transmission systems U1 and U2 are adapted to the type of transmission path which is employed. Before a message can be transmitted from the data device D1 to the data device D2, the crypto devices S1 and S2 must be phased and in synchronism with respect to one another.

Figure 2:
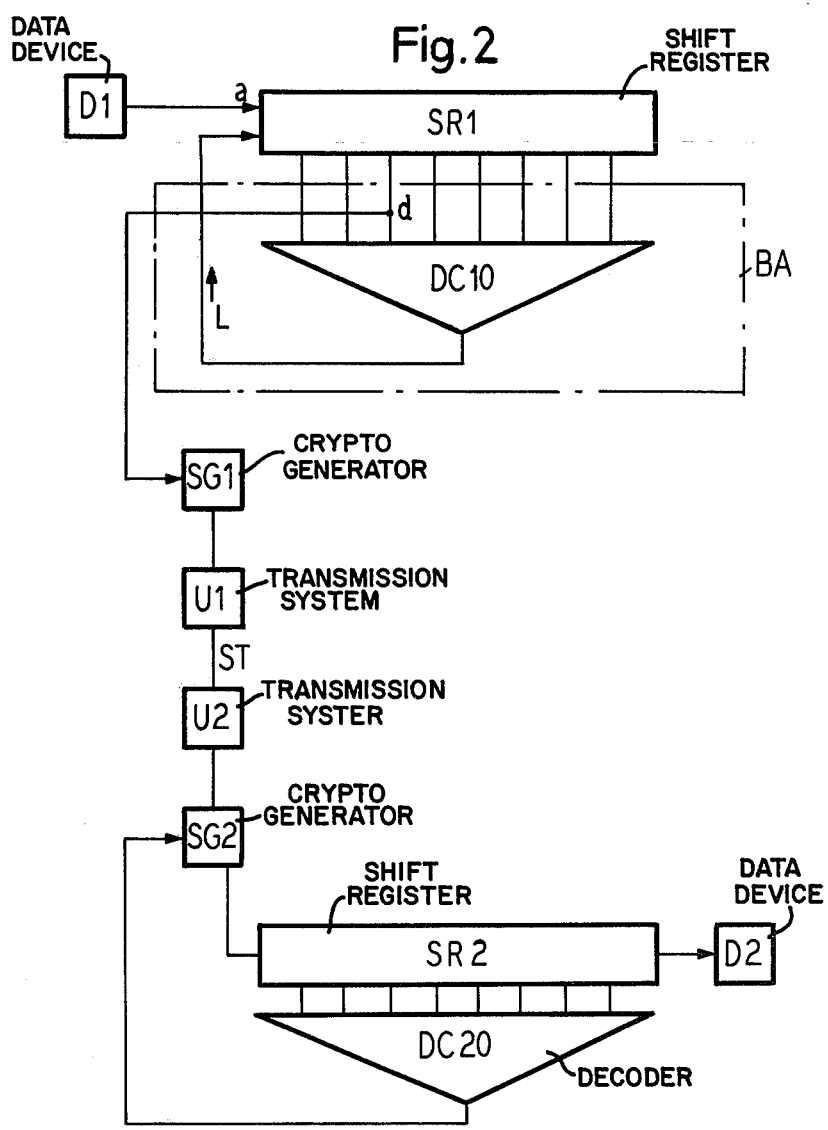
FIG. 2 is a schematic block diagram of a data transmission system having an order evaluator in accordance with the present invention.

FIG. 2 illustrates a semi-duplex data transmission system in which the data of the data source D1 are serially entered into a shift register SR1 and are supplied to the transmission system U1 by way of a crypto generator SG1. On the receiving side, a crypto generator SG2 is connected to the transmission system U2 and enters the data decrypted thereby into a receiving side shift register SR2 whose output is connected to the data device D2.

The transmitting side crypto device S1, in accordance with FIG. 2, contains the shift register SR1 and the crypto generator SG1. When the data transmission direction from the data device D1 to the data device D2 is to be changed then the crypto device S1 emits an order block, in a manner well known in the art but not illustrated herein, and such order block is stored at the receiving side in the shift register SR2. With the help of a decoder DC20, this order block is recognized on the receiving side and a signal is emitted from the output of the decoder with the help of which a crypto generator in the receiving side crypto device S2 is stopped in a character-correct manner. Simultaneously, the transmitting side crypto generator provided in the crypto device S1 is also stopped in a character-correct manner.

The data emitted by the data device D1 are supplied to the shift register SR1 by way of the input a and are serially shifted from line to line in accordance with the rhythm of a stepped timing sequence. These data are supplied to the crypto generator SG1 by way of an output d. In the case of the transmission of data, it cannot be prevented that bit patterns occur which equal an order block. In order to avoid that such order blocks are stored in the shift register SR2 at the receiving side, and thereupon causing a faulty control of the receiving side crypto device, such order blocks are recognized with the help of a decoder DC10 and a reset signal L is emitted from the output of the decoder DC10 to cause erasure of the individual data stored in individual ones, or all of, the cells of the shift register SR1.

Figure 3:
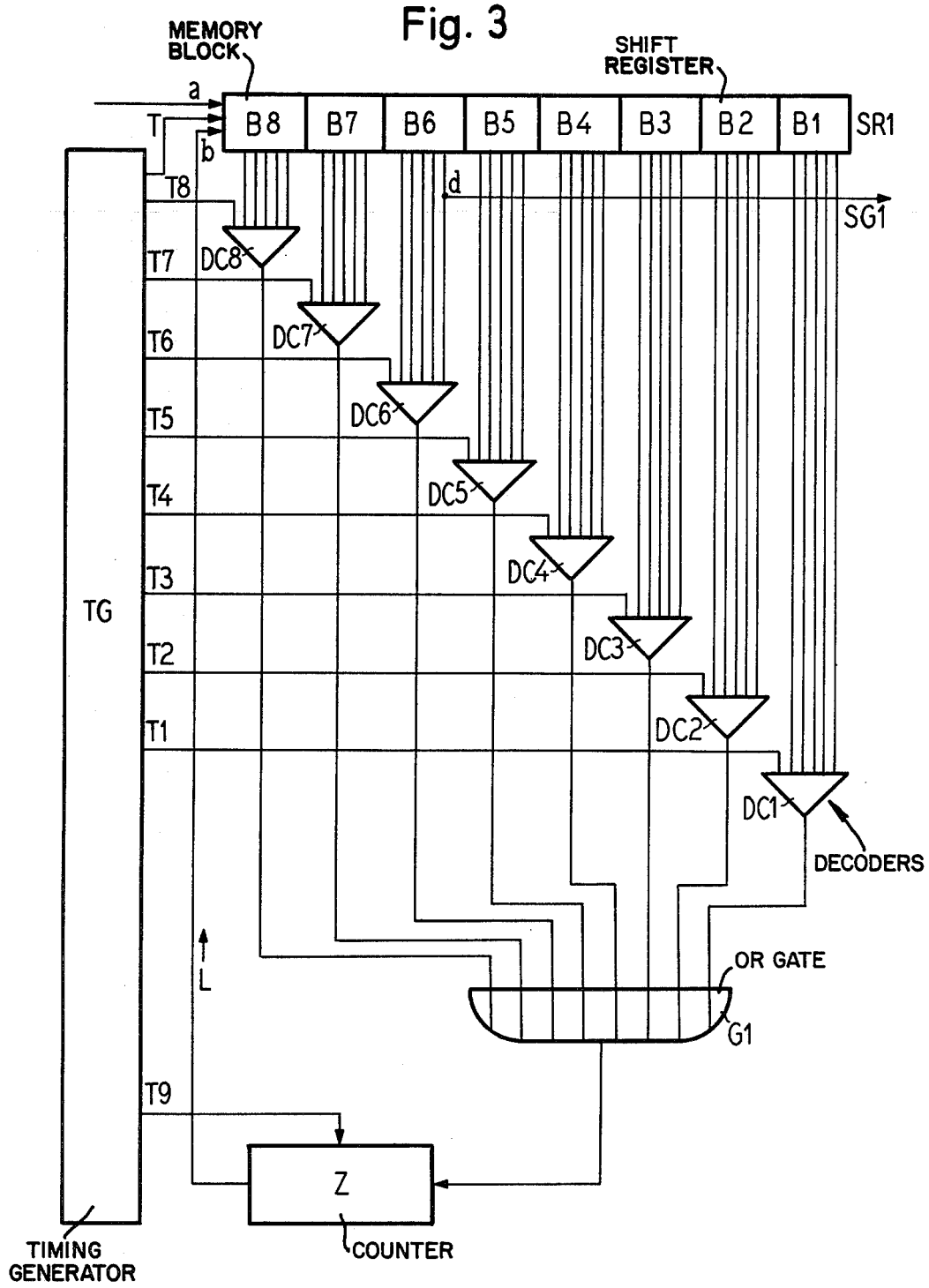
FIG. 3 is a schematic diagram of a first exemplary embodiment of the order evaluator illustrated in FIG. 2.

FIG. 3 illustrates an embodiment of an order evaluator having a plurality of decoders DC1-DC8, and OR gate G1, a counter Z and a timing generator TG, in greater detail. In the case of this exemplary embodiment of the invention, it is assumed that the shift register SR1 contains a total of 40 memory cells, five of which form each of the memory blocks B1, B2, B3, B4, B5, B6, B7 and B8. The data stored in these cells of the shift register may be read out in parallel via five outputs of the memory blocks B1 through B8, respectively. The outputs of the cells of the memory blocks B1 or B2 or B3 or B4 or B5 or B6 or B7 or B8, respectively, are connected to the decoders DC1 or DC2 or DC3 or DC4 or DC5 or DC6 or DC7 or DC8, respectively.

Figure 4:
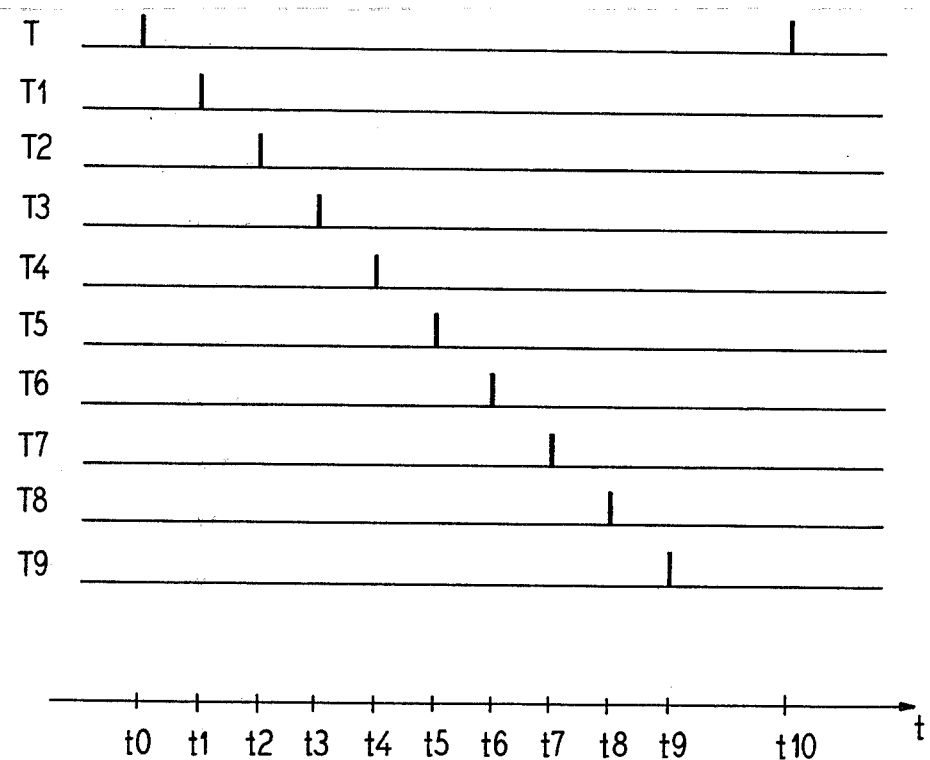
FIG. 4 is a signal diagram of signals which occur during the operation of the order evaluator illustrated in FIG. 3.

FIG. 4 illustrates signals which occur during the operation of the order evaluator illustrated in FIG. 3. The pulses of the timing signals T are the shift pulses with the help of which the data supplied via the inputs a are step-by-step shifted from one cell into the next cell of the shift register. The decoders DC1 through DC8 only emit a signal toward the OR gate G1 when, on the one hand, the bit pattern, which is to be decoded, is provided at its inputs and when, on the other hand, a pulse of the timing signals T1 through T8 occurs. It is now assumed that at the time t0 a bit pattern is stored in the 40 cells of the shift register SR1 which is accidentally equal to an order block. The decoders DC1 through DC8 recognize this order block and emit pulses by way of the OR gate G1 which are supplied to the counter Z as counting pulses. The decoders DC1 through DC8 therefore respectively emit a pulse at the times t1, t2, t3, t4, t5, t6, t7, and t8. When the counter Z reaches the counter state 6, it emits a reset signal L with the help of which the contents of the shift register SR1 are erased. In the given case, the erasure signal L is therefore emitted at the instant t6 and is supplied to the input b. Since the transmitted data are emitted toward the crypto generator SG1 by way of the output d of the shift register SR1, only the data stored in the memory blocks B6, B7 and B8 are concerned with erasure at the time t6, but not the data stored in the memory blocks B1 through B5, since these data have already been processed toward the crypto generator SG1. If individual ones of the decoding devices, for example the decoding devices D6 and D7, had not emitted any pulses at the instants t6 or t7 respectively, the sixth counting pulse would have reached the counter Z at the time t8, so that the reset signal L would have occurred at the time t8. At the time t10, another bit is written into the last cells of the shift register SR1 and the memory block B8, via the input a and therefore the storing of the data is again started.

The counter state of the counter Z where the reset signal L is emitted is fixed in such a way that it corresponds to the order evaluation in the range of the shift register SR2 and the decoder DC20, in accordance with FIG. 2. It is thereby presumed that an order block is signaled with the shift register SR2 and the decoder DC20 when six of the eight bit groups of the order block are recognized.

FIG. 5 illustrates a further exemplary embodiment of an order evaluator which, in addition to the components illustrated in FIG. 3, contains three AND gates G6, G7 and G8. The counter Z, starting from the counter state five, emits the reset signal L to one input each of the AND gates G6, G7 and G8, which gates are therefore prepared for opening. When, at the times t1 through t5, a pulse of the signals T1 through T5 was respectively supplied to the counter Z by way of the OR gate G1, the counter Z then emits the reset signal L=1. If then, for example, the decoder DC6 also emits a pulse at the time t6 to the OR gate G1 on the one hand, and to the AND gate G6, on the other hand, the gate G6 opens and a pulse reaches the input c of the block B6, and the content of the memory block B6 is therefore erased. This output signal is therefore characterized in that only the content of that memory block B6 is erased whose content is equal to a five bit group of the order block, whereas the memory blocks B1 through B5 and B7 and B8 are not erased. In this manner, the data which are to be transmitted are only changed in a minor way. It might also be imagined that a total of five pulses are, for example, only emitted by the decoders D1, D2, D3, D6, D7 so that the reset signal L is emitted from the time t7. If then a pulse is also emitted by the decoder D8 at the time t8, then the AND gate G8 will open, and a pulse will be emitted at its output to erase the content of the memory block D8, whereas the content of the memory blocks B1 through B7 are not changed.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for controlling semiduplex crypto data transmission in a data transmission system which includes a data source, a transmitter crypto device, a transmission path, a receiving crypto device and a data terminal, said circuit arrangement comprising:

a shift register interposed between said data source and said transmitter crypto device to receive data serially, said shift register including a data input connected to the data source, a reset input, a data output connected to the transmitter crypto device, and a plurality of parallel outputs including said data output; and an order evaluator connected to said plurality of outputs and to said reset input and operable to emit an reset signal in response to an order word which is equal to a stop order block.

2. The circuit arrangement of claim 1, wherein said shift register is sub-divided into memory blocks each having a plurality of memory cells with each of said blocks including a plurality of outputs, and further comprising a plurality of decoders, each of said decoders connected to the outputs of a respective memory block and each having an output, a counter having a counting input and an output, said output connected to said reset input, and an OR gate connecting the outputs of said decoders to said counting input, said counter operable to emit the reset signal in response to reaching a predetermined count.

3. The circuit arrangement of claim 2, comprising a plurality of AND gates each having two inputs and an output, one input of each of said AND gates connected to said output of said counter and the other input connected to an output of a respective decoder, each of said blocks connected to a decoder so associated with an AND gate including an reset input connected to the output of the respective AND gates, whereby the reset signal is emitted to clear a particular block upon a predetermined count and order word detection by that particular block.

* * * * *